United States Patent Office 3,001,399
Patented Sept. 26, 1961

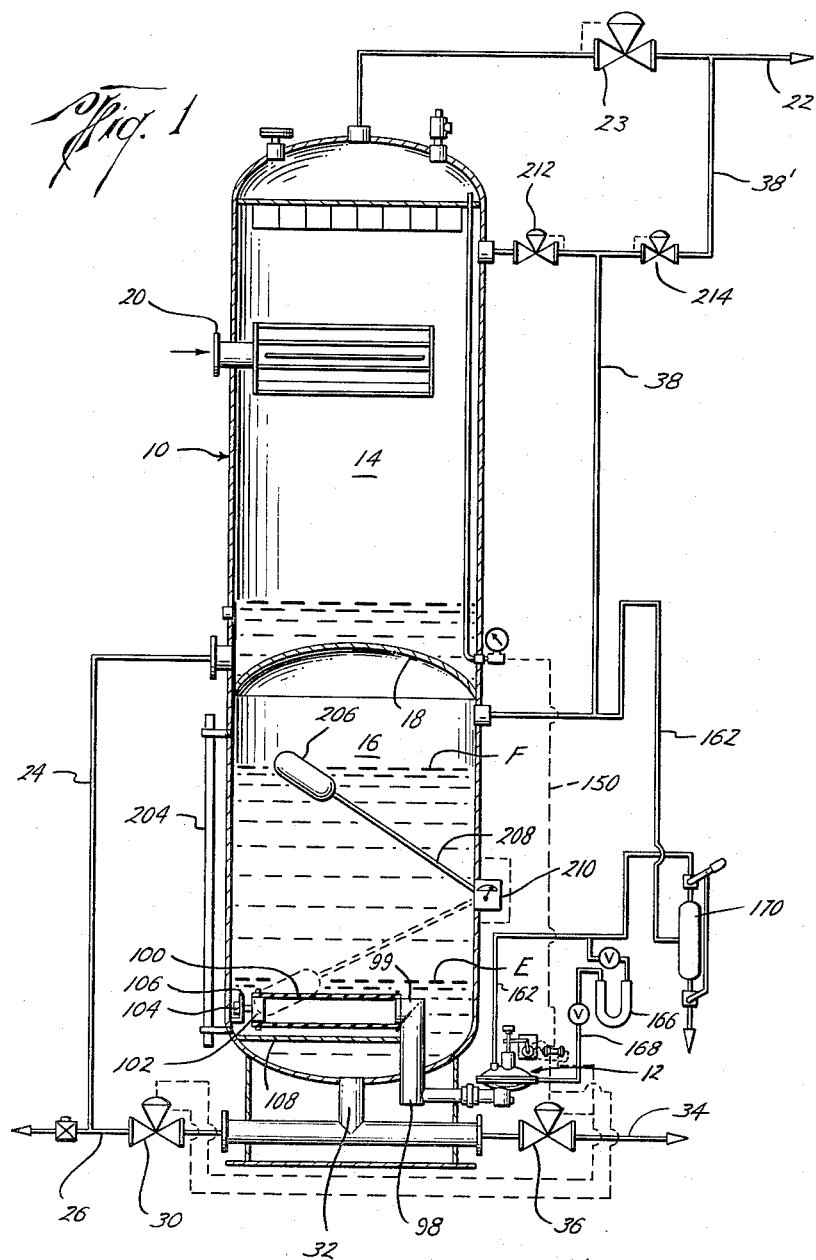

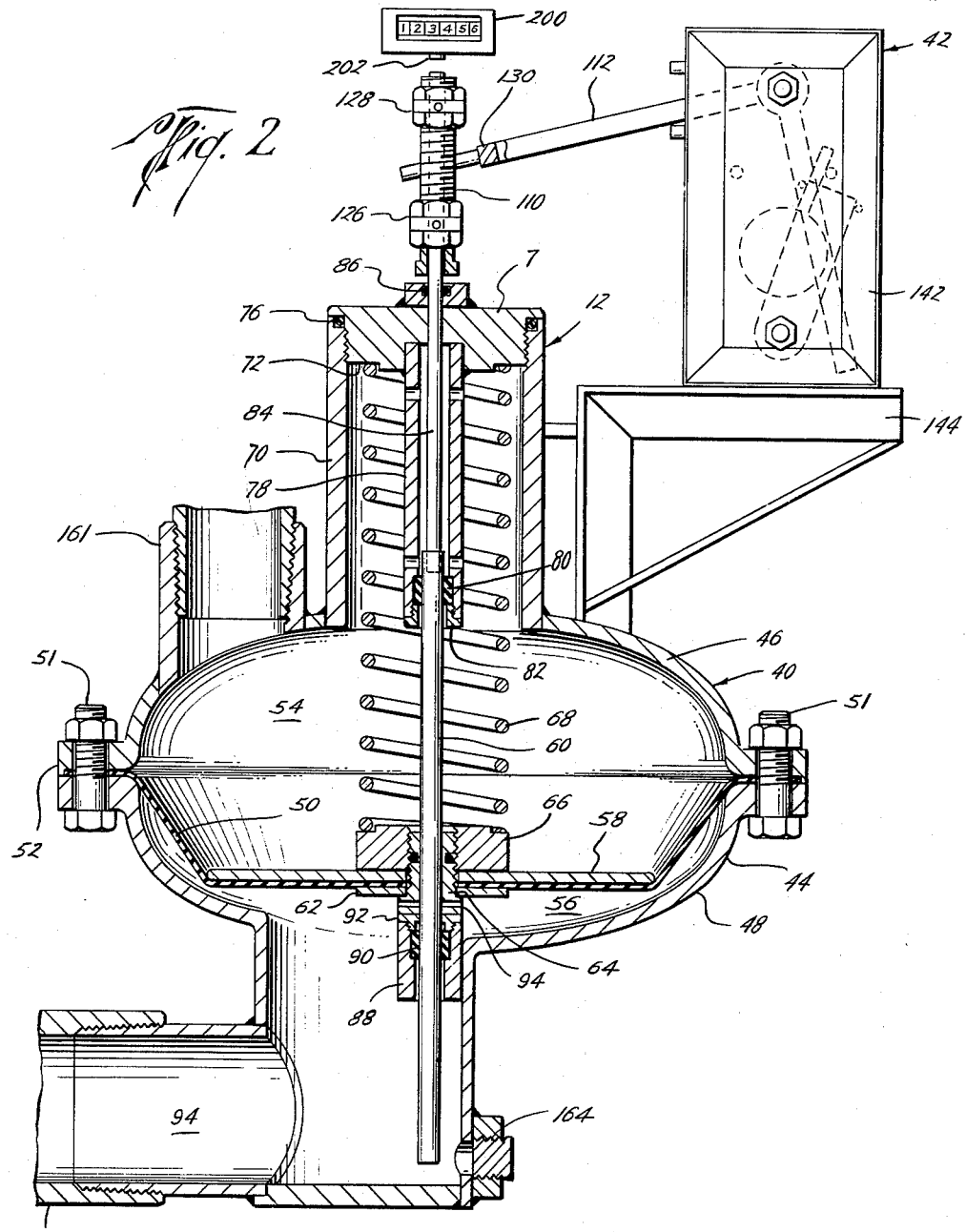

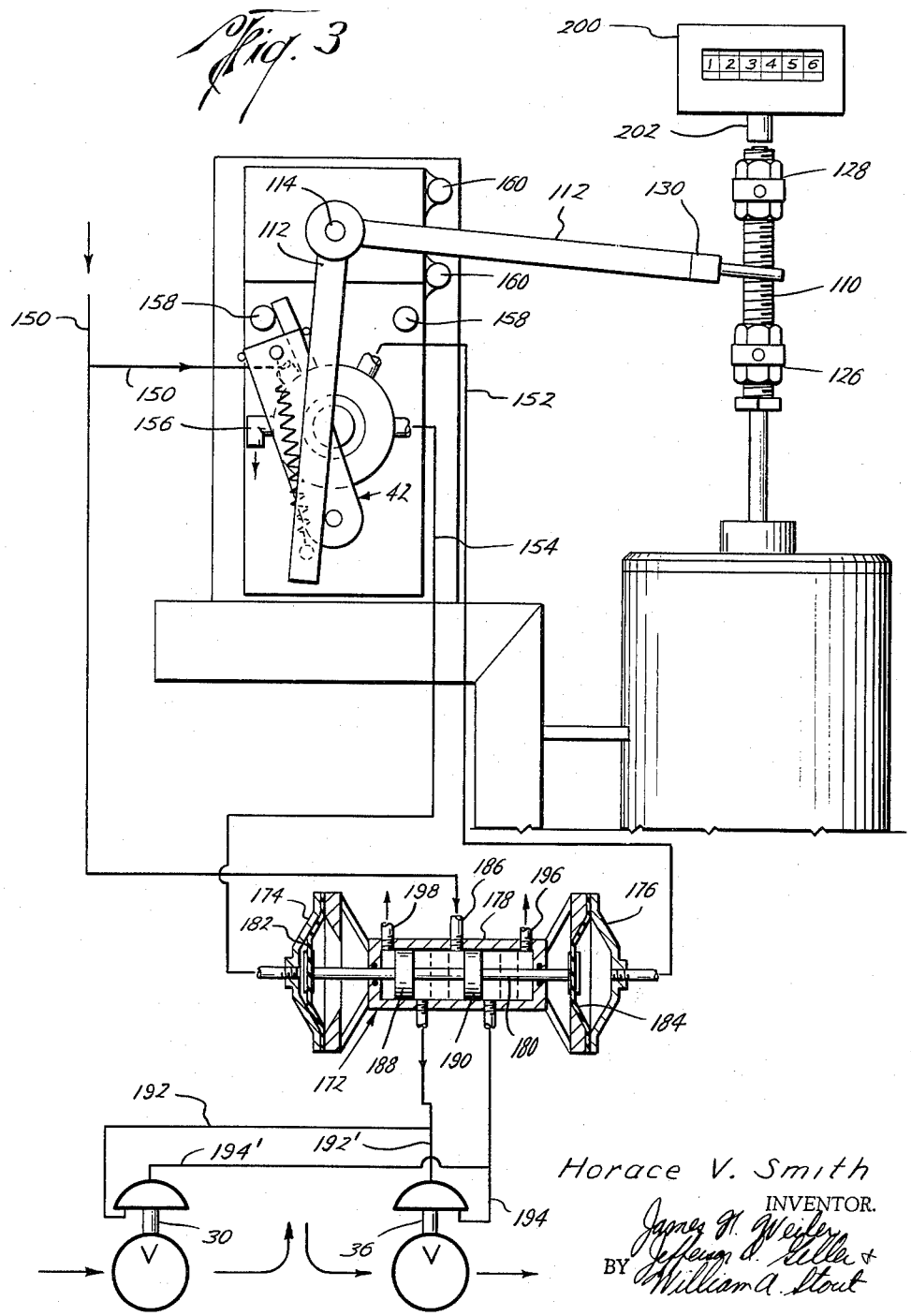

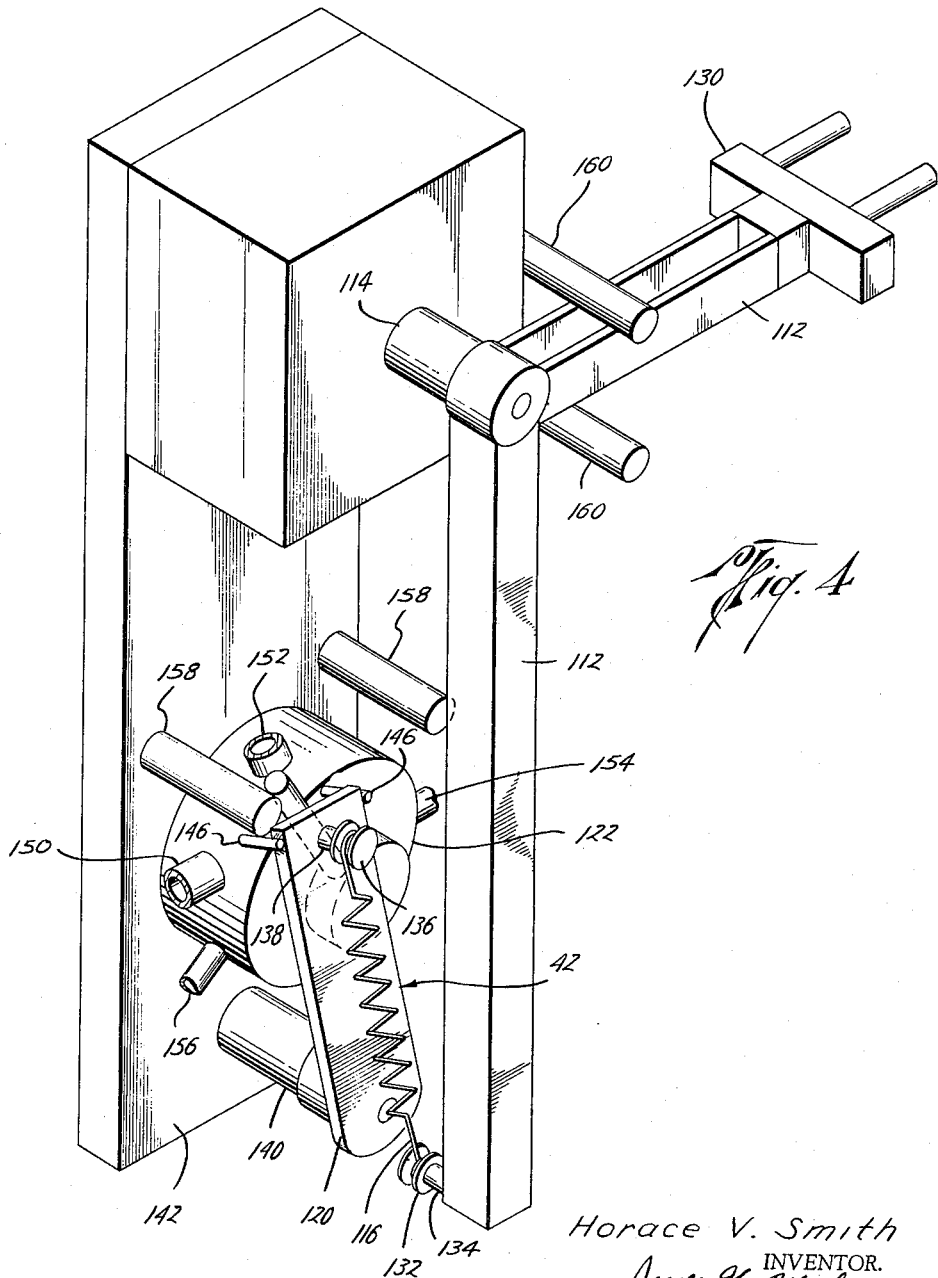

3,001,399
METERING APPARATUS AND HYDROSTATIC HEAD CONTROL SYSTEM
Horace V. Smith, Houston, Tex., assignor to Oil Metering and Processing Equipment Corp., Houston, Tex., a corporation of Texas
Filed Feb. 3, 1958, Ser. No. 712,823
3 Claims. (Cl. 73—223)

This invention relates to a hydrostatic head control system and more particularly to one adapted to operate flow controlling valves in response to the weight of a liquid in a container and to a hydrostatic head controlled metering apparatus.

In the handling of liquids, such as crude oil flowing from oil wells and petroleum products, the volume flow of such liquids often needs to be measured. For example, the flow of crude oil from an oil well is measured to determine among other things the quantity for which payment is to be made. In the blending of petroleum products and other liquids the amounts of liquids to be blended need to be controlled by measurement. To meter liquids it is a common practice to provide a metering vessel of known volume which is alternately filled and emptied between predetermined levels by the operation of float controlled valves with each such cycle being counted. However, sometimes such liquids are foaming and such foam changes the liquid level at which the float, influenced by the foam, actuate valves so that the actual volume of liquid passing through the metering vessel varies depending upon the amount of foam. To overcome foam and other matters, such as temperature, affecting density this hydrostatic head liquid level controller and metering apparatus were developed which are operated by the weight of liquid so that a constant weight is controlled or passed through a metering vessel even though the volume may vary.

It is, therefore, a general object of the present invention to provide a metering apparatus in which inlet and outlet valve elements are controlled by the weight of the liquid being metered.

It is another general object of the present invention to provide a hydrostatic head control system operable in response to the weight of liquid which system is extremely accurate and flexible in operation.

Another object of the present invention is to provide a hydrostatic head control system utilizing a lost motion snap acting mechanism for on-off operation of valves which permits accurate control of a great range of heights of liquid columns.

A further object of the present invention is the provision of such a hydrostatic head control system utilizing a lost motion snap acting mechanism in combination with a spring loaded diaphragm permitting substantial movement of the spring loaded diaphragm before the snap acting mechanism actuates a valve control.

A still further object of the present invention is the provision of such a hydrostatic head control system including a novel means to prevent contamination of the diaphragm assembly of such system and to dampen the effect on the control system of fluctuation of liquid.

Yet a further object of the present invention is the provision of such a system in which the calibration of the control elements may be effected from the outside so that the head of liquid may be readily calibrated and various repairs made from the outside.

And a still further object of the present invention is the provision of such a system which is relatively inexpensive to manufacture, maintain and repair and is dependable in operation.

Other and further objects, features and advantages will be apparent from the following description of the presently preferred examples, given for the purpose of disclosure and taken in conjunction with the accompanying drawings, where like character references designate like parts throughout the several views and where:

FIGURE 1 is a partially sectional elevation of a metering separator incorporating a hydrostatic head controller of the present invention, FIGURE 2 is an enlarged sectional elevation of the diaphragm assembly of the hydrostatic head controller of the present invention, FIGURE 3 is a partially diagrammatic view illustrating the preferred valve arrangement of FIGURE 1, and FIGURE 4 is a perspective view of a lost motion snap acting pilot mechanism of the hydrostatic head controller.

Referring now to the drawings, and particularly to FIGURE 1, there is illustrated a metering separator indicated generally by the numeral 10 in which the hydrostatic controller indicated generally by the numeral 12 may be incorporated.

This metering separator 10 includes as the upper portion thereof a separator chamber 14 separated from a liquid container or metering vessel 16 in the lower portion thereof by a plate 18. A fluid inlet 20 to the separator chamber 14 permits fluids, such as mixtures of oil and gas, to enter the separator chamber 14 where they are separated by gravity with the gas passing out the gas discharge line 22 through a back pressure valve 23 and the oil accumulating in the lower portion of the separator chamber 14 on the plate 18. A liquid discharge line 24 communicates between the lower portion of the separator chamber 14 and an inlet line 26 to the liquid container 16. Liquid may pass through the inlet line 26 controlled by an inlet valve element, here illustrated as a double acting pressure responsive valve 30, and through the flow line 32 into the lower portion of the liquid container 16. Similarly, an outlet line 34 controlled by an outlet valve element, such as the double acting pressure responsive valve 36, communicates with the flow line 32 so that upon opposite simultaneous actuation of the inlet and outlet valves 30 and 36 liquid may fill and empty the liquid container 16. A gas equalizing line 38 communicating between the upper portion of the liquid container 16 and the upper portion of the separator chamber 14 is provided.

Referring now to FIGURE 2, the hydrostatic head controller 12 includes the diaphragm assembly 40 and the lost motion snap acting mechanism 42. The diaphragm assembly 40 includes a diaphragm housing 44 having an upper cap 46 and a lower cap 48 held together such as by the bolts 51 in the flanges 52. An imperforate flexible diaphragm 50 held at its periphery by the flanges 52 forms a movable member which divides the diaphragm housing 44 into upper and lower chambers 54 and 56 respectively. Provided on the top of the diaphragm 50 is a metal diaphragm plate 58 vertically through the center of which passes a guide stem 60 secured to and movable with the diaphragm plate 58 and diaphragm 50 by a cramp ring 62 and cramp stud 64 on the lower side of the diaphragm 50 and by cramp nut 66 on the upper surface of the diaphragm plate 58. Thus upon reciprocation of the diaphragm 50, as will be explained later, the stem 60 vertically reciprocates therewith.

Tending to depress the diaphragm 50 into the position illustrated in FIGURE 2 is resilient means such as the compression spring 68 resting at its lower end on the upper cramp nut 66 and passing upwardly into the spring case 70 extending upwardly from the diaphragm housing 44. The spring 68 internally receives the stem 60 and bears against an annular shoulder 72 of a closure cap 7 threadedly secured in the upper end of the spring case 70 which closure cap 7 is provided with packing 76 to prevent fluid leakage. Depending from the closure cap 7 is a tubular upper stem guide 78 into the lower end of which slideably extends the stem 60.

Preferably, the lower end of the upper stem guide 78 is provided with a guide bushing 80 held in place by a nut 82 to receive the wear between the stem 60 and the upper stem guide 78 as the stem 60 reciprocates. Secured to and extending upwardly from the upper end of the stem 60, through the upper stem guide 78, and slideably through the closure cap 7 is a stem extension 84 so that reciprocating motion of the diaphragm 50 is transmitted through the stem 60 and stem extension 78 to the exterior of the diaphragm housing 44. Packing 86 prevents the escape of fluid around the stem extension 84 where it passes through the closure cap 7.

Below the diaphragm 50 the stem 60 is slideably received by a lower stem guide 88 secured such as by welding to the diaphragm housing 44 with this lower stem guide 88 having at its upper end a lower guide bushing 90 held in place by a lower guide nut 92. As illustrated, the lower guide nut 92 is contacted through resilient washers 94 by the cramp stud 64 when the diaphragm 50 is in its lowest position as illustrated in FIGURE 2 and prevents further downward movement of the diaphragm 50.

The lower portion of the diaphragm housing 44 below the diaphragm 50 is provided with a fluid inlet 94 receiving the diaphragm flow line 96 connected to the standpipe 98 (see FIGURE 1) extending into the lower part of the liquid container 16 so that the weight of liquid in the liquid container 16 may be exerted against the lower surface of the diaphragm 50 and tend to move it upwardly overcoming the spring 68. The standpipe 98 has a vertical portion provided with an elbow 99. Horizontally secured to the elbow 99 and closing the end of the standpipe 98 is a flexible membrane here illustrated in the form of a flexible rubber tube 100 closed at one end by the plate 102. The end of the flexible tube 100 spaced from the elbow 99 is adjustably supported by a bolt 104 supported by a bracket 106 secured to a wall of the liquid container or metering vessel 16. Lateral adjustment of this bolt 104 adjusts tension on the flexible tube 100 as desired. Additionally, a supporting plate 108 may be provided immediately below the flexible tube 100 to support it if excess sagging occurs.

Any type of flexible membrane may be used in connection with the standpipe 98 which membrane when compressed by the weight of liquid in the liquid container 16 will displace a volume as great as that displaced by the diaphragm 50 between its lowest and highest positions.

Referring to FIGURES 2, 3 and 4, the lost motion snap acting mechanism 42 is shown to include the adjustable engaging member 110 secured to the top of the stem extension 84 for movement therewith, an L-shaped swing arm 112 pivotally mounted on a shaft 114, and a tension spring 116 secured to the swing arm 112 and to a pivot arm 120 for actuation of a control such as the pilot valve 122.

The adjustable engaging member 110 is an externally threaded sleeve secured at its lower end to the upper end of the stem extension 84. A lower stop nut 126 and an upper stop nut 128 on the externally threaded sleeve provide adjustment for upper and lower liquid levels as will be hereinafter explained. Bracketing the adjustable engaging member 110 between the upper and lower stop nuts 128 and 126 respectively is a substantially U-shaped bracket 130 secured to one end of the swing arm 112 which bracket is contacted by these stop nuts 126 and 128 after predetermined reciprocation of the adjustable engaging member 110 thereby providing lost motion between the stem 60 and the swing arm 112.

A grooved rotatable sleeve 132 to help reduce friction is secured on a pin 134 extending from the lower end of the swing arm 112. One end of the tension spring 116 is secured in the groove on this rotatable sleeve 132 and the other end is secured to a similar grooved rotatable sleeve 136 attached to a pin 138 extending from the pivot arm 120. The pivot arm 120 is pivotally mounted such as by the shaft 140 in the plate 142 secured to a bracket 144 mounted on the diaphragm housing 44. Secured to and projecting from the upper end of the pivot arm 120 is a pair of spaced projections 146 forming contact members that straddle the pilot actuating arm 148 of the pilot valve 122 and strike the pilot actuating arm 148 when the pivot arm 120 is moved from side to side thereby moving the pilot actuating arm 148 and actuating the pilot valve 122. In the pilot valve 122 here illustrated a gas supply line 150 from the top of the separator chamber 14 supplies pressure to the pilot valve 122 with pressure being selectively directed therefrom through the lines 152 and 154 by movement of the pilot actuating arm 148. In operation, a conventional exhaust port 156 permits back pressure to drain from the line 152 or 154 not then being supplied with fluid pressure. Such pilot valve is readily available commercially and no detailed description of it is necessary.

As shown, the tension spring 116 is connected to the swing arm 112 on one side of the shaft 140 forming the pivot of the pivot arm 120 and connected to the pivot arm 120 on the other side of the shaft or pivot point 140. Thus, the tension of the spring 116 tends to hold the pivot arm 120 on whatever side of the shaft 140 the lower end of the spring 116 is at that time.

To prevent the pivot arm 120 from damaging the pilot valve 122 when the pilot actuating arm 148 is thrown from side to side by the projections 146, a pair of stops 158 extend outwardly from the plate 142 on each side of the pilot actuating arm 148. These stops 158 are spaced so that the pilot actuating arm 148 has sufficient movement to operate the pilot valve 122, but are placed close enough together to prevent damage to the control. Also, a pair of swing arm stops 160 secured to the plate 142 limit movement of the swing arm 112.

In operation of the lost motion snap acting mechanism 42 the reciprocation of the diaphragm 50 and consequently of the stem extension 84 causes a corresponding movement in the adjustable engaging member 110. This causes the stop nuts 126 and 128, after predetermined movement, to alternately contact the swing arm 112 and swing it first in one direction and then in the other in response to movement of the adjustable engaging member 110 as described. As the swing arm 112 moves from one side to the other tension on the spring 116, when it passes the straight line through the shaft 140 and the pin 136, snaps the pivot arm 120 from one extreme position to the other. As the pivot arm 120 is oscillated on its shaft 140 the projections 146 strike the pilot actuating arm 148 actuating the pilot valve 122.

It will be noted that the projections 146 are spaced farther apart than the width of the pilot actuating arm 148 so that only one such projection 146 is in contact with the pilot actuating arm 148 at any one time and there is a space between the pilot actuating arm 148 and the other projection 146. Because the pivot arm 120 contacts the pilot actuating arm 148 only by the projections 146, if there should be any creeping of the pivot arm 120 before the spring 116 passes the shaft 140 such motion is not transmitted to the pilot actuating arm 148 because the particular projection 146 which will strike the pilot actuating arm 148 is spaced from it. This lost motion between the pivot arm 120 and the pilot actuating arm 148, in the event there should be any creeping of the pivot arm 120, together with the actuation of the spring 116, prevents any creeping of the pilot valve 122 and the pilot valve 122 is snap acted by the striking of one of the projections 146 when the tension of the spring 116 snaps the pivot arm 120.

Varying the distance between the inner ends of the stop nuts 126 and 128 and the swing arm 112 varies the amount of movement of the diaphragm 50 needed to actuate the snap acting mechanism 42. As the extent of movement of the diaphragm 50 is dependent upon the hydrostatic head acting against its lower surface this adjustment of the stop nuts 126 and 128 calibrates the amount of hydrostatic head controlled by the hydrostatic head controller 12.

This lost motion snap acting mechanism 42 other than the pilot valve 122 is disclosed and claimed in Patent No. 2,818,738 issued January 7, 1958, for a Snap Acting Mechanism.

Referring now to FIGURES 1 and 2, a connection 161 provided at the upper chamber 54 for a gas equalizing line 162 connected to the metering vessel 16 of the metering separator 10 equalizes pressures between the upper chamber 54 and the metering vessel 16. A drain 164 permits draining of the lower chamber 56. A manometer 166 may be placed in a line 168 between the lower chamber 56 and the line 162 to the upper chamber 54 for calibration of the hydrostatic head necessary to actuate the hydrostatic head controller 12. Also, a conventional condensate chamber 170 may be placed in the line 162 to keep liquid out of the upper chamber 54.

As best seen in FIGURES 1 and 3 the inlet and outlet valves 30 and 36 respectively are controlled by the lost motion snap acting mechanism 42 through fluid pressure from the pressure line 150. As larger volumes of fluid than are available through the pilot valve 122 are often necessary to actuate the inlet and outlet valves 30 and 36 respectively as quickly as desired there is preferably interposed between the pilot valve 122 and the inlet and outlet valves 30 and 36 a larger volume pilot valve here shown as a double diaphragm 4-way valve indicated generally by the numeral 172 which includes the left hand diaphragm assembly 174 and the right hand diaphragm assembly 176. Contained in the housing 178 of this 4-way valve is the horizontal valve stem 180 connected at its left end to the flexible diaphragm 182 in the left diaphragm assembly 174 and at its right end to the flexible diaphragm 184 in the right hand diaphragm assembly 176. The lines 154 and 152 from the pilot valve 122 are connected to the diaphragm assemblies 174 and 176 so as to apply pressure to and drain it from the outer surfaces of the diaphragms 182 and 184. In the position shown in FIGURE 3 pressure has been applied to the outside of the right hand diaphragm 184 and bled from the outside of the left hand diaphragm 182 forcing the valve stem 180 to the left. By bleeding pressure from the right hand diaphragm assembly 176 and applying it to the left hand diaphragm assembly 174 the valve stem 180 will be reciprocated to the right.

In the position illustrated in FIGURE 3 fluid pressure entering the inlet port 186 from the supply line 150 passes between the valve stem enlargements 188 and 190 into the pressure lines 192 and 192′ connected to the inlet and outlet valves 30 and 36 here illustrated as double acting diaphragm motor valves. Pressure in line 192 flows against the underside of the diaphragm (not shown) of the inlet valve 30 opening the inlet valve 30 and pressure in line 192′ flows against the upper side of the diaphragm (not shown) of the outlet valve 36 closing this valve. Pressure in the line 194 from the under side of the diaphragm of the outlet valve 36 and in the pressure line 194′ from the upper side of the diaphragm of the inlet valve 30 drains into the 4-way valve 172 to the right of the valve stem enlargement 190 and out the exhaust port 196.

When actuation of the pilot valve 122 reciprocates the valve stem 180 to the right so that the valve stem enlargements 188 and 190 are in the position indicated by the dotted lines, pressure entering from the pressure line 150 will pass through the 4-way valve 172 into the pressure lines 194 and 194′ against the under side of the diaphragm of the outlet valve 36 opening it and against the upper side of the diaphragm of the inlet valve 30 closing it. Pressure in the lines 192 and 192′ drains through the housing 178 to the left of the valve stem enlargement 188 and out the exhaust port 198. Thus as the valve stem 180 is reciprocated, pressure from the supply line 150 will be alternately directed through the pressure lines 192 and 192′, and 194 and 194′ to opposite sides of the diaphragms of the inlet and outlet valves 30 and 36 and pressure will be simultaneously bled from the other side of their diaphragms thereby simultaneously opening one such inlet or outlet valve and closing the other inlet or outlet valve.

The 4-way valve here illustrated is conventional, readily available on commercial markets, and a satisfactory valve is the 4-way valve model 62—28—62 of Valvair Corporation, 454 Morgan Avenue, Akron 11, Ohio, with double diaphragms. Accordingly, no further description thereof is necessary.

The preferred inlet and outlet valves 30 and 36 are double acting pressure responsive motor diaphragm valves which have a spring loaded diaphragm with pressure being applied to each side of the diaphragm. Such valves are readily available on the market and a satisfactory valve is Model SMT-DA manufactured by Kimray, Inc., Oklahoma City, Oklahoma, and no further description thereof is necessary.

As the assembly illustrated in FIGURE 1 includes a metering unit the number of times the metering vessel 16 empties and fills is to be counted which can be done by the means illustrated in FIGURES 2 and 3 which includes a counter 200 having a spring loaded actuator 202 contacted by the adjustable engaging member 110 upon reciprocation of this adjustable engaging member by movement of the diaphragm 50 caused by change of hydrostatic head of the liquid in the metering vessel 16.

In operation of the metering apparatus illustrated in FIGURE 1, which includes a separator, the flexible tube 100, the standpipe 98, the flow line 96, and the diaphragm housing 44 below the diaphragm 50 are filled with a non-viscous and non-corrosive liquid. Mixtures of liquids and gasses enter the fluid inlet 20 of the metering separator 10 where they are divided in the separator chamber 14 by gravity into gas and liquid with the gas passing out the gas outlet line 22 and the liquid collecting in the lower part of the separator chamber 14. The liquid so collected passes downwardly through the liquid discharge line 24 to the liquid inlet line 26. Assuming that the liquid level in the liquid container 16 is at the lowest or E level, the inlet valve 30 is open, and the outlet valve 36 is closed, the diaphragm 50 will be at its lowermost position as illustrated in FIGURE 2 because of the expansive force of the spring 68 urging the diaphragm downwardly. As liquid flows into the liquid container 16 the weight of the hydrostatic head of such liquid acting through the flexible tube 100 on liquid in the standpipe 98 exerts an upward force against the lower side of the diaphragm 50 overcoming the expansive force of the spring 68 moving the diaphragm 50 and adjustable engaging member 110 upwardly. Because of the lost motion between the swing arm 112 and the adjustable engaging member 110 no motion is imparted to the swing arm 112 until sufficient hydrostatic head of liquid has built up in the liquid container 16 to move the diaphragm 50 upwardly to such a position that the lower stop nut 126 contacts the U-shaped bracket 130 on the swing arm 112 and moves the swing arm 112 sufficiently to snap the pivot arm 120 causing it to strike the pilot actuating arm 148 and operate the pilot valve 122. This occurs when a desired weight of liquid is acting upon the under surface of the diaphragm 50 regardless of the characteristics, such as foaming, of the liquid in the metering vessel 16.

Upon the pilot valve 122 being so actuated it will direct pressure to the line 154 into the left hand diaphragm assembly 174 of the 4-way pilot valve 172 and allow back pressure in the line 152 to drain from the right hand diaphragm assembly 176 and out the exhaust port 156. This causes the stem 180 of the 4-way valve 172 to reciprocate to the right moving the valve stem enlargements 188 and 190 into the dotted positions so that fluid pressure from the supply line 150 is directed through the lines 194' and 194 to the top of the diaphragm in the inlet valve 30 and to the underneath side of the diaphragm in the outlet valve 36 and simultaneously back pressure is drained through the lines 192 and 192' from the underneath side of the diaphragm of the inlet valve 30 and from the top of the diaphragm of the outlet valve 36 causing the inlet valve 30 to close and the outlet valve 36 to open causing the liquid in the container 16 to drain out the outlet valve 36.

As the liquid level in the liquid container 16 falls decreasing the hydrostatic head acting against the under surface of the diaphragm 50 the compression spring 68 moves the diaphragm 50 downwardly until the diaphragm 50 reaches a position slightly above the lowermost position illustrated in FIGURE 2. During the downward movement of the diaphragm 50 no motion will be imparted by the adjustable engaging member 110 to the swing arm 112 until the swing arm 112 is contacted and moved by the upper stop nut 128. When the diaphragm 50 reaches a position slightly above the position illustrated in FIGURE 2 the swing arm 112 will have moved sufficiently to snap the pivot arm 120 causing it to strike the pilot actuating arm 148 and operate the pilot valve 122 reversing the flow of pressure in the lines 152 and 154 to the 4-way valve 172 causing a reversal of flow of pressure from the 4-way valve 172 through the lines 192 and 192', and 194 and 194' closing the outlet valve 36 and opening the inlet valve 30 permitting the metering vessel 16 to again begin to fill, repeating the cycle of accurately metering a constant weight of liquid regardless of its volume.

It is to be noted that the lowest level E of liquid in the liquid container is always above the top of the elbow 99 and flexible tube 100 illustrated in FIGURE 1 so that all changes of hydrostatic head in the liquid container 16 influence the diaphragm 50. This flexible tube 100 not only keeps contaminants out of the diaphragm assembly 40 and allows any desired liquid to be used in the diaphragm assembly 40 regardless of that being metered, but it also serves to dampen the effect of liquid level fluctuations which often occur in the metering vessel 16 during the draining of it. If undampened, these fluctuations acting against the lower part of the diaphragm 50 will sometimes cause premature actuation of the lost motion snap acting mechanism 42 and consequently of the inlet and outlet valves 30 and 36. However, if desired, the flexible tube 100 may be omitted and the standpipe 98 filled with a non-viscous liquid heavier than the liquid being metered. The elbow 99 will prevent sediment from entering the standpipe 98 and the hydrostatic head of liquid being metered will be exerted directly against the heavier liquid in the standpipe 98.

Because of the lost motion between the adjustable engaging member 110 and the swing arm 112 a considerable amount of movement of the diaphragm 50 is permitted before actuation of the pilot actuating arm 148. This permits the use of a spring 68 of considerable length giving extreme accuracy of control of the force exerted by the spring 68 on the diaphragm 50 and hence an accurate control of the measurement of the actual weight of liquid on the diaphragm 50.

Referring again to FIGURE 1, a conventional sight gauge 204 on the metering vessel 106 and a float 206 on a right float arm 208 pivoted at an indicator dial 210 may be used to observe and indicate the level of liquid in the metering vessel 16.

When viscous liquids are being metered in the metering separator 10 of FIGURE 1 it is advantageous to assist the gravity flow into the metering vessel 16 with pressure which may be done without waste of the gas above the liquid in the metering vessel 16 by providing a pressure reducing regulator 212 in the gas equalizing line 38 and a back pressure valve 214 in a branch line 38' connected to the gas discharge line 22 downstream of its back pressure valve 23. This pressure reducing valve 212 and the back pressure valve 214 are set at a few pounds less pressure than the back pressure valve 23 so that during filling of the liquid container 16 when the pressure at the top of it reaches the amount necessary to operate the back pressure valve 214 (which is less than the pressure in the separator chamber 14), the back pressure valve 214 will open permitting a pressure differential between the separator chamber 14 and the metering vessel 16 so that liquid is forced from the separator chamber 14 into the metering vessel 16 by pressure in addition to gravity. As the metering vessel 16 drains of liquid and its pressure falls this back pressure valve 214 will close allowing pressure from the separator chamber 14 through the pressure regulator 212 and pressure equalizing line 38 to force the liquid out of the metering vessel 16.

While the metering apparatus of the present invention has been described in use with a metering separator it may of course be used without the separator and be used with metering vessels of any type. In addition, the hydrostatic head liquid level controller itself may be used with metering vessels or any other type of liquid container and for many different purposes. Further, certain arrangements of parts and substitutions of parts will suggest themselves to those skilled in the art which are encompassed within the spirit of the invention and the scope of the appended claims.

The present invention therefore is well suited to carry out the objects and attain the advantages and ends mentioned as well as others inherent therein. Accordingly, the invention is to be limited only by the spirit thereof and the scope of the appended claims.

What is claimed is:

1. In combination, a liquid container, a flow line communicating with said liquid container, a valve in said flow line, a control means connected to and adapted to actuate the said valve, a housing, a movable member in the housing movable in response to pressure differentials on each side of the member and dividing the housing into first and second chambers, a liquid line communicating between a lower part of the liquid container and the first chamber, a conduit between the second chamber and an upper part of the liquid container, resilient means urging the movable member toward the first chamber, and a snap acting mechanism connected to the movable member and the control means adapted to actuate the control means upon predetermined movement of the movable member said snap acting mechanism including lost motion linkage.

2. The combination of claim 1 in which the snap acting mechanism includes an engageable member movable by the movable member upon reciprocation of the movable member, a first arm movable by the engageable member, a second arm pivotally mounted and movable by the first arm upon predetermined movement of the engageable member, and linkage connecting said second arm to the control means adapted to actuate said control means upon predetermined movement of the second arm.

3. A metering apparatus comprising a liquid container, inlet and outlet flow lines communicating with said liquid container, inlet and outlet valve elements in said flow lines, a control means connected to and adapted to actuate said valves simultaneously and oppositely, a housing, a movable member in the housing movable in response to pressure differentials on each side of the member and dividing the housing into first and second chambers, a liquid line communicating between a lower part of the liquid container and the first chamber, a conduit between the second chamber and an upper part of the liquid container, resilient means urging the movable member toward the first chamber, and a snap acting mechanism connected to the movable member and the control means adapted to actuate the control means upon predetermined movement of the movable member said snap acting mechanism including lost motion linkage.

References Cited in the file of this patent

UNITED STATES PATENTS

| | | |
|---|---|---|
| 1,295,638 | Triggs | Feb. 25, 1919 |
| 1,357,960 | Cruse | Nov. 9, 1920 |
| 2,633,750 | Langstaff | Apr. 7, 1953 |
| 2,696,748 | Lupfer | Dec. 14, 1954 |
| 2,717,516 | Swift | Sept. 13, 1955 |
| 2,737,973 | Kimmell | Mar. 13, 1956 |
| 2,803,263 | Kenney | Aug. 20, 1957 |
| 2,818,738 | Smith et al. | Jan. 7, 1958 |

UNITED STATES PATENT OFFICE
CERTIFICATE OF CORRECTION

Patent No. 3,001,399 September 26, 1961

Horace V. Smith

It is hereby certified that error appears in the above numbered patent requiring correction and that the said Letters Patent should read as corrected below.

Column 8, line 75, strike out "part of".

Signed and sealed this 27th day of February 1962.

(SEAL)
Attest:

ERNEST W. SWIDER
Attesting Officer

DAVID L. LADD
Commissioner of Patents